United States Patent [19]

Matsufuji et al.

[11] Patent Number: 5,318,838
[45] Date of Patent: Jun. 7, 1994

[54] MAGNETIC RECORDING MEDIUM COMPRISING FERROMAGNETIC PARTICLES, BINDER RESINS AND PHENYL PHOSPHONIC ACID

[75] Inventors: Akihiro Matsufuji; Kiyomi Ejiri; Mikihiko Kato; Takao Ohya, all of Kanagawa, Japan

[73] Assignee: Fuji Photo Film Co., Ltd., Kanagawa, Japan

[21] Appl. No.: 26,163

[22] Filed: Mar. 1, 1993

Related U.S. Application Data

[63] Continuation of Ser. No. 697,745, May 6, 1991, abandoned, which is a continuation of Ser. No. 299,490, Jan. 23, 1989, abandoned.

[30] Foreign Application Priority Data

Jan. 22, 1988 [JP]  Japan .................................. 63-12989

[51] Int. Cl.$^5$ .............................................. G11B 5/00
[52] U.S. Cl. ..................................... 428/328; 428/403; 428/425.9; 428/522; 428/694 BG; 428/694 BP; 428/694 TP; 428/900; 252/62.54
[58] Field of Search ............... 428/695, 694, 900, 402, 428/403, 407, 694 BP, 694 TP, 694 BG, 328, 425.9, 522; 252/62.55, 62.54; 523/181; 524/139

[56] References Cited

U.S. PATENT DOCUMENTS

| | | | |
|---|---|---|---|
| 2,959,568 | 11/1960 | Havens et al. | 260/45.75 |
| 2,997,454 | 8/1961 | Leistner et al. | 260/45.8 |
| 3,630,790 | 5/1969 | Schmidt et al. | 148/6.15 R |
| 4,071,610 | 1/1978 | Koester et al. | 423/634 |
| 4,197,357 | 4/1980 | Huisman | 428/539 |
| 4,540,627 | 9/1985 | Ishizawa et al. | 428/328 |
| 4,621,008 | 11/1986 | Takasugi et al. | 428/216 |
| 4,668,283 | 5/1987 | Honda et al. | 75/0.5 AA |
| 4,690,863 | 9/1987 | Miyoshi et al. | 428/328 |
| 4,707,410 | 11/1987 | Hata et al. | 428/413 |
| 4,735,848 | 4/1988 | Kondo et al. | 428/219 |
| 4,761,338 | 8/1988 | Asano et al. | 428/425.9 |
| 4,842,942 | 6/1989 | Yatsuka et al. | 428/425.9 |

OTHER PUBLICATIONS

Course on Plastic Materials (Plastic Zairyo Koza) [2], "Polyurethane Resin", Keiji Iwata, Nikkan Kogyo Shinbun-sha, pp. 11–13 (1979).

*Primary Examiner*—Stevan A. Resan
*Attorney, Agent, or Firm*—Sughrue, Mion, Zinn, Macpeak & Seas

[57]    ABSTRACT

A magnetic recording medium comprising a non magnetic support having thereon a magnetic layer comprising binder resins, ferromagnetic particles and an organic phosporus compound.

2 Claims, No Drawings

MAGNETIC RECORDING MEDIUM COMPRISING FERROMAGNETIC PARTICLES, BINDER RESINS AND PHENYL PHOSPHONIC ACID

This is a continuation of application Ser. No. 07/697,745 filed May 6, 1991, now abandoned, which is a continuation of application Ser. No. 07/299,490 filed Jan. 23, 1989, now abandoned.

FIELD OF THE INVENTION

The present invention relates to a magnetic recording medium comprising a non-magnetic support and a magnetic layer.

BACKGROUND OF THE INVENTION

Magnetic recording media are widely used as audio tapes, video tapes and floppy disks. A magnetic recording medium is basically comprised of a non-magnetic support having thereon a magnetic layer containing a binder and ferromagnetic particles dispersed therein.

It is necessary for a magnetic recording medium to have high levels of various characteristics such as electromagnetic conversion characteristics, running durability and running efficiencies. With the recent development of 8 mm video tape recorders, it is particularly necessary for a video tape to produce a high video output, have excellent capabilities for reproducing original images, and in particular have excellent electromagnetic conversion characteristics.

There have been various approaches for improving the electromagnetic characteristics of a magnetic recording medium of these, the approach of improving the characteristics of ferromagnetic particles as a magnetic recording substance is direct and effective. Accordingly, innovators continually attempt to achieve high density recording by ever more finely granulating ferromagnetic particles.

Another approach is to use iron oxide modified with different metals such as cobalt instead of using iron oxide per se as the material for forming the ferromagnetic particle. Recently, ferromagnetic metals such as iron, nickel or cobalt and alloys containing the above metals have been used, for this purpose.

A magnetic recording medium having essentially good electromagnetic conversion characteristics can now be obtained by using the thus improved ferromagnetic particles. However, it is difficult to produce a magnetic recording medium which achieves improved electromagnetic conversion characteristics by virtue of improving the ferromagnetic particles. This is because the dispersibility of the ferromagnetic particles decrease as the particles become more finely granulated, and dispersibilities of $\gamma$-iron oxide, cobalt-coated $\gamma$-iron oxide and ferromagnetic metal particles in this order tend to become reduced, which is the characteristics of ferro-magnetic particles.

To overcome this difficulty in preparing a magnetic coating composition, the steps of mixing, kneading and dispersing have been carried out for a long period of time in an attempt to improve the dispersibility of the ferromagnetic particles. However, in many cases the beneficial characteristics of the ferromagnetic particles are deteriorated by the shearing force which occurs upon mixing, kneading and dispersing. Furthermore, the long period of time necessary for producing such a magnetic recording medium is a problem in view of operation efficiencies.

In this connection, methods of effectively dispersing ferromagnetic particles without substantially modifying the conventional method for preparing a magnetic recording medium have been investigated and suggested. One method comprises using ferromagnetic particles which have been surface treated with a surface processing agent such as a silane coupling agent. Another method comprises pre-treating ferromagnetic particles with a component (dispersing agent) such as a fatty acid which improves the dispersibility of the ferromagnetic particles as disclosed in JP-B-54-7074 and GB-A-1450241 (The term "JP-B" as used herein means an examined Japanese patent publication). Still another method comprises adding the above-described fatty acid during preparation of the magnetic coating composition.

However, it was confirmed by the present inventors that even the above methods could not sufficiently improve the dispersibility of ferromagnetic particles.

That is, when ferromagnetic particles are surface-treated with the above-described silane coupling agent, the state of dispersibility thereof in a magnetic coating composition is generally stable, but in some cases, the compatibility toward the resin components actually deteriorates. Accordingly, this method cannot sufficiently improve the state of dispersibility of the ferromagnetic particles in a magnetic layer. Further, the fatty acids generally added as a lubricating agent in a magnetic layer have a dispersing effect upon ferromagnetic particles. Such a dispersing effect cannot fully be obtained unless one uses a larger amount of the fatty acids which function as dispersing agents than the amount of the fatty acids which function lubricating agents in a magnetic layer. However, when a large amount of fatty acids is used, another problem arises: the binder becomes plasticized.

Furthermore, as the dispersibility of ferromagnetic particles is improved by the above method, the surface smoothness of the magnetic layer is hightened. Therefore, the friction coefficient on the surface of the magnetic layer increases, thereby deteriorating the running properties and running durability.

JP-A-63-42025 discloses a magnetic recording medium using benzoic acid and the salt thereof as a dispersing agent, which medium can avoid the problem of the binder becoming plastisized when the above-described fatty acids are used (The term "JP-A" as used herein means a published unexamined Japanese patent application). This magnetic recording medium has good dispersibility and prevents the binder from plasticizing, but cannot have a satisfactory running property and running durability.

SUMMARY OF THE INVENTION

An object of present invention is to provide a magnetic recording medium having particularly excellent electromagnetic conversion characteristics, running properties and running durability.

Another object of the present invention is to provide a magnetic recording medium having electromagnetic conversion characteristics which are improved by improving the dispersibility of the ferromagnetic particles in the magnetic layer in order to maximize the electromagnetic conversion characteristics of the medium without deteriorating running properties and running durability.

Other objects and effects of the present invention will be apparent from the following description.

The above objects of the present invention have been attained by a magnetic recording medium comprising a non-magnetic support having thereon a magnetic layer comprising a binder and ferromagnetic particles dispersed therein, the magnetic layer containing an organic phosphorous compound represented by at least one of formulae (1) to (3):

   (1)

   (2)

   (3)

wherein R represents a substituted or unsubstituted alkyl group, a substituted or unsubstituted alkenyl group or a substituted or unsubstituted aryl group; M represents a hydrogen atom, an alkali metal or $-N^+(R^1)_4$ wherein $R^1$ represents a substituted or unsubstituted alkyl group; and n represents 1 or 2. M preferably represents a hydrogen atom.

DETAILED DESCRIPTION OF THE INVENTION

The preferred embodiments of the above-described magnetic recording medium of the present invention are as follows.

1. The above-described magnetic recording medium wherein R in formulae (1) to (3) is a substituted or unsubstituted aryl group.

2. The above-described magnetic recording medium wherein R in formulae (1) to (3) is a substituted or unsubstituted phenyl group.

3. The above-described magnetic recording medium wherein the amount of the above-described organic phosphorus compound in the magnetic layer is from 0.03 to 10 parts by weight per 100 parts by weight of the ferromagnetic particles.

4. The above-described magnetic recording medium wherein the binder is a hardened resin which contains a polar group.

5. The above-described magnetic recording medium wherein the ferromagnetic particles are fine ferromagnetic metal particles having a specific surface area of 42 $m^2/g$ or more.

In the magnetic recording medium of the present invention, the state of dispersion of the ferromagnetic particles in a magnetic layer is remarkably improved by using an organic phosphorus compound which functions as a dispersing agent.

That is, the organic phosphorus compounds used in the present invention have the property of being adsorbed on a surface of a metal, and the adsorption power of these organic phosphorous compounds is stronger than that of other organic acid compounds such as carboxylic acid or sulfonic acid. Therefore, the organic phosphorus compounds once adsorbed on the surface of a metal hardly come off. Accordingly, the surfaces of the ferromagnetic particles of the present invention have organic phosphorus compounds firmly adhered to them. That is , the aromatic rings preferably contained in the phosphorous compound of the present invention are uniformly distributed on the surface of the ferromagnetic particles.

Such ferromagnetic particles have a remarkably improved affinity to the resin component of the magnetic layer, and thus the dispersibility of the ferromagnetic particles in the magnetic layer of the present invention is excellent, whereby the magnetic recording medium of the present invention has good electromagnetic conversion characteristics.

In accordance with the above effects of the organic phosphorus compounds, the ferromagnetic particles and the binder have a strong interaction. Accordingly, the ferromagnetic particles hardly come off from the magnetic layer, and thereby, running properties and running durability are remarkably improved.

Thus, the magnetic recording medium of this invention has excellent electromagnetic conversion characteristics and good running properties and running durability.

The magnetic recording medium of the present invention basically comprises a non-magnetic support having thereon a magnetic layer containing ferromagnetic particles dispersed in a binder.

The materials for forming the non-magnetic support are those generally used as materials for the support of a conventional magnetic recording medium.

Examples of these materials include polyethylene terephthalate, polypropylene, polycarbonate, polyethylene naphthalate, polyamide, polyamideimide, polyimide, and metal foil such as aluminum foil or stainless foil.

The thickness of the non-magnetic support is generally from 2.5 to 100 $\mu m$, preferably from 3 to 80 $\mu m$.

The non-magnetic support may be provided with a backing layer on the surface of the support which is opposite the surface provided with the magnetic layer.

In the magnetic recording medium of the present invention, a magnetic layer containing ferromagnetic particles dispersed in a binder may be provided on the above described non-magnetic support.

Examples of ferromagnetic particles include metal oxide ferromgnetic particles such as $\gamma\text{-}Fe_2O_3$, $Fe_3O_4$ or Bertholide; ferromagnetic particles which are combinations of different metals with iron oxide (such as barium ferrite or Co-containing $\gamma\text{-}Fe_2O_3$); and fine ferromagnetic metal particles mainly comprised of ferromagnetic metals such as iron.

The shape of the ferromagnetic particles used in this invention is not particularly limited. Generally, acicular, granular, dice-like, rice-grain like and plate-like particles are used. Acicular particles are particularly preferred.

In the magnetic recording medium of the present invention it is preferred to use fine ferromagnetic metal particles which have relatively poor dispersibility as their nature. Thus, ferromagnetic metal fine particles containing iron, cobalt or nickel having a specific surface area of 42 $m^2/g$ or more, preferably 45 $m^2/g$ or more, are preferred to most effectively achieve the advantages of the present invention.

Such fine ferromagnetic metal particles preferably have a metal content of 75 wt % or more, and more than 80 wt % of the metal content is comprised of at least one ferromagnetic metal or alloy (e.g., Fe, Co, Ni, Fe—Co, Fe—Ni, Co—Ni, Co—Ni—Fe), and 20 wt % or less of the metal content is comprised of other elements (e.g., Al, Si, S, Sc, Ti, V, Cr, Mn, Cu, Zn, Y, Mo, Rh, Pd, Ag, W, Sn, Sb, B, Te, Ba, Ta, Re, P, Au, Hg, Bi, La, Ce, Pr, Nd, Pb, Zn). The above-described ferromagnetic metal content may contain a slight amount of water, hydroxide or oxide. The method for preparing these fine ferromagnetic metal particles is known; the fine ferromagnetic metal particles used in the present invention can be prepared by a conventional method.

In accordance with the present invention, the magnetic layer containing the ferromagnetic particles dispersed in a binder contains at least one organic phosphorus compound represented by at least one of formulae (1) through (3);

$$(R-O)_nP(OM)_{3-n} \qquad (1)$$
(with O double bond on P)

$$(R-O)_nP(OM)_{3-n} \qquad (2)$$

$$(R)_nP(OM)_{3-n} \qquad (3)$$
(with O double bond on P)

wherein R is a substituted or unsubstituted alkyl group, alkenyl group or aryl group; M is a hydrogen atom, an alkali metal or $-N^+(R^1)_4$ wherein $R^1$ is an alkyl group; and n is 1 or 2.

Specific examples of M include a hydrogen atom, a sodium atom, a potassium atom and a tetraethylammonium ion. M preferably represents a hydrogen atom.

Specific examples of R include linear or branched alkyl groups which preferably have from 1 to 22 carbon atoms, such as a methyl group, an ethyl group, a propyl group, a butyl group, a hexyl group, a heptyl group, an octyl group, a nonyl group, a decyl group, a dodecyl group, a tetradecyl group and an octadecyl group.

Examples of R also include linear or branched alkynyl groups such as a vinyl group, a propenyl group, an isopenyl group, a butenyl group, a pentenyl group, an allyl group and an oleyl group.

Examples of R also include aryl groups such as a phenyl group, a naphthyl group, an anthryl group, a diphenyl group, a diphenyl methyl group, a p-ethylphenyl group, a tolyl group and a xylyl group.

Examples of R also include alkyl groups, alkenyl groups an aryl groups which have substituents other than hydrocarbon groups, such as a 2-aminoethyl group, a 2-butoxyethyl group and a p-nitrophenyl group.

The above-mentioned aryl group examples of R may be those containing rings other than a benzene ring, such as indene or tetralin.

The organic phosphorous compounds represented by the above formulae (1) to (3) include mono and diesters of phosphoric acid and the salts thereof such as α-naphthyl phosphoric acid:

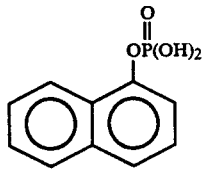

phenyl phosphoric acid:

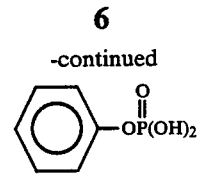

diphenyl phosphoric acid:

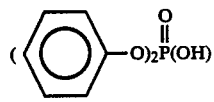

n-butyl phosphoric acid:

$$n\text{-}C_4H_9OP(OH)_2$$
(with O double bond on P)

di-n-butyl phosphate:

$$(n\text{-}C_4H_9O)_2P(OH)$$
(with O double bond on P)

di(2-ethylhexyl)phosphate:

$$((CH_3(CH_2)_3\overset{C_2H_5}{\underset{|}{C}}HO)_2P(OH)$$
(with O double bond on P)

isopropyl phosphate:

$$(CH_3)_2CHOP(OH)$$
(with O double bond on P)

diisopropyl phosphate:

$$((CH_3)_2CHO)_2P(OH)$$
(with O double bond on P)

mono and diesters of phosphorus acid and the salts thereof such as di n-butyl phosphite: $(n\text{-}C_4H_9O)_2P(OH)$
diethyl phosphite: $(C_2H_5O)_2P(OH)$
dioleyl phosphite: $(C_{18}H_{35}O)_2P(OH)$ diphenyl phosphite:

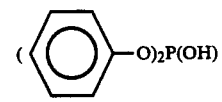

phosphonic acid and the salts thereof such as p-ethylbenzene phosphonic acid:

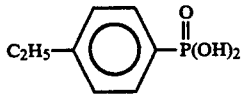

phenylphosphonic acid:

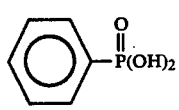

and phosphonic acid and the salts thereof such as phenyl phosphinic acid:

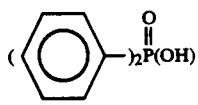

Among these examples, organic phosphorus compounds having an aryl group are preferred, and organic phosphorus compounds having a phenyl group are more preferred.

The above-described organic phosphorus compounds have the property of adsorbing or bonding on the surface of a metal due to the polar groups contained therein. It is believed therefore that in a magnetic layer the above-described organic phosphorus compounds remain adsorbed or bonded on the surfaces of ferromagnetic particles due to the polar groups. The power of the organic phosphorus compounds of the present invention to adsorb on metal surfaces is stronger than that of other organic acid compounds and therefore, once the organic phosphorus compounds are adsorbed on the metal surfaces they are unlikely to drop therefrom.

The organic phosphorus compounds firmly adhere to the surfaces of the ferromagnetic particles of the present invention, and the aromatic rings preferably contained in the phosphorous compound of the present invention uniformly distributed on the surface of the ferromagnetic particles. Accordingly, the affinity of the ferromagnetic particles toward the resins is improved, and the stable dispersibility of the ferromagnetic particles is also improved.

Since the ferromagnetic particles and binders have strong reciprocal relationship due to the effects of the organic phosphorus compounds, the ferromagnetic particles do not drop off from the magnetic layer, and thus, running properties and running durability are remarkably improved. Further, the organic phosphorus compounds of the present invention have a relatively lower tendency to absorb water as compared with other organic acid compounds such as sulfonic acid. Therefore, the present invention exhibits excellent water resistance and durability.

The above-described organic phosphorus compounds are generally present in the magnetic layer of the present invention in an amount of from 0.03 to 10 parts by weight per 100 parts by weight of the ferromagnetic particles. When the amount of the organic phosphorus compounds is from 0.04 to 7 parts by weight, the dispersibility of the ferromagnetic particles is further improved, as is the gloss on the surface of the magnetic layer. When the amount of the organic phosphorus compounds is from 0.05 to 5 parts by weight, the electromagnetic characteristics are remarkably improved. When the amount of the organic phosphorus compounds is less than 0.03 part by weight, the compounds are not always effective, and when the amount is more than 10 parts by weight, the dispersibility of the ferromagnetic particles is improved in the same degree as the case when 10 parts by weight of the organic phosphorus used.

Methods for incorporating the organic phosphorus compounds into the magnetic layer to improve the dispersibility of the ferromagnetic particles include a number of methods. For example, in one such method the ferromagnetic particles are pretreated with the organic phosphorus compound, and the pretreated particles are added to the magnetic coating composition. The pretreated ferromagnetic particles can be prepared by the steps of dissolving or dispersing the organic phosphorus compounds in an organic solvent having a low boiling point, adding the ferromagnetic particles into the resulting dispersion, and mixing and removing the organic solvent to form the pretreated particles. In another method for incorporating the organic phosphorus compounds into the magnetic layer, the organic phosphorus compounds are dissolved or dispersed into a portion of the solvent used for preparing the magnetic coating composition, and the resulting dispersion is then added into the magnetic coating composition during the mixing, kneading and dispersing of the magnetic coating composition.

As a binder which can be used in the present invention, a conventional binder can be used in an amount of generally from 10 to 40 parts by weight, preferably from 15 to 30 parts by weight per 100 parts by weight of the ferromagnetic particles.

Examples of usable resins include cellulose derivatives, vinyl chloride copolymer-resins (e.g., a copolymer comprising vinyl chloride and vinyl acetate, and a copolymer comprising vinyl chloride, vinyl acetate and maleic anhydride), a vinylidene chloride, copolymers, polyester resins, acrylic resins, polyvinyl acetal resins, polyvinyl butyral resins, phenoxy resins, epoxy resins, a copolymer of butadiene and acrylonitrile, polyurethane resins and urethane epoxy resins. In the present invention, these resins can be used alone or in combination.

It is preferred to use polyurethane resins and vinyl chloride copolymer resins in combination. Further, in the above case, it is particularly preferred that the repeating unit of at lease one of the above resins contain a polar group.

Examples of the aforementioned polar group-containing repeating unit, which is contained in the vinyl chloride copolymer resin, include —COOM$^1$, —SO$_3$M$^1$, —OSO$_3$MI, and —PO(OM$^1$)$_2$, wherein M$^1$ is a hydrogen atom or an alkali metal atom. The vinyl chloride copolymer resins may contain one or more repeating units; and preferably the chloride copolymer resins contain a repeating unit containing —SO$_3$Na and/or a repeating unit containing —COOH.

The aforementioned polar group-containing repeating unit is generally present in the copolymer in an amount of from 0.001 to 5.0 mol %, preferably from 0.05 to 3.0 mol %. When the amount of the polar group-containing repeating unit is lower than 0.001 mol %, the dispersibility of the ferromagnetic particles decreases in some cases, and when the content of the polar group-containing repeating unit is higher than 5.0 mol %, the copolymer takes on a moisture absorbing property, and the magnetic tape tends to lose its weather resistance.

It is preferred that the above-described vinyl chloride copolymer resins further contain a repeating unit which contain an epoxy group. In this case, the epoxy group has the effect of (i) stabilizing the vinyl chloride copolymer resins, and (ii) preventing the vinyl chloride copolymer resins from dehydrochloric acid reaction which would otherwise proceed with the passage of time.

Preferably, the epoxy group-containing repeating unit is present in the vinyl chloride copolymer resins in an amount of from 1 to 30 mol %. Further, the epoxy group-containing repeating unit is preferably present in an amount of from 0.01 to 0.5 mol, more preferably from 0.01 to 0.3 mol, per 1 mol of the vinyl chloride repeating unit which is present in the vinyl chloride copolymer.

The above-described vinyl chloride copolymer resins have a number average molecular weight of generally from 10,000 to 100,000, preferably from 15,000 to 60,000.

The above-described polar group-containing vinyl chloride copolymer resins can be prepared in accordance with conventional technology by copolymerizing the vinyl chloride monomer with a monomer having both a polar group and a reactive double bond. Examples of the monomer having both a polar group and a reactive double bond include 2-acrylamide-2-methylpropane sulfonic acid, 2-methacrylamide-2-methylpropane sulfonic acid, vinyl sulfonic acid and the alkali metal salts thereof, ethyl acrylic acid-2-sulfonate and the alkali metal salts thereof, ethyl methacrylic acid-2-sulfonate and the alkali metal salts thereof, maleic acid anhydride, maleic acid, acrylic acid, methacrylic acid, acrylic acid-2-phosphate and methacrylic acid 2-phosphate.

In preparing a monomer having a reactive double bond and an epoxy group, glycidylacrylate or glycidylmethacrylate is generally used to introduce the epoxy group.

Further, the polar group-containing vinyl chloride copolymer resins can be prepared by the steps of; (1) preparing a hydroxyl group-containing vinyl chloride copolymer, and (2) reacting the hydroxyl group with a compound which has both a polar group and a chlorine atom (e.g., monochloroacetic acid), and (3) introducing an epoxy group by a dechloric acid reaction with epichlorohydrin. The polar group-containing copolymer prepared by the above method can be used in the present invention.

In preparing the vinyl chloride copolymer resin, other monomers (e.g., vinyl ether, α-monoolefin, acrylic acid ester, unsaturated nitrile, aromatic vinyl, vinyl ester) can be included in such an amount that the characteristics of the vinyl chloride copolymer resin are not deteriorated.

When polyurethane resins are employed which have a repeating unit which contains a polar group, examples of such a polar group-containing repeating unit include $-SO_3M^1$, $-OSO_3M^1$, $-COOM^1$ and $-PO(OM^1)_2$, wherein $M^1$ is a hydrogen atom or an alkali metal atom. These repeating units may be present alone or in combination in the polyurethane resins. Among these, it is preferred that the polyurethane resins contain a repeating unit containing $-SO_3Na$ and/or a repeating unit containing $-COOH$.

The polar group-containing repeating unit is present in the polyurethane resin generally in an amount of from 0.001 to 5.0 mol %, preferably from 0.01 to 2.0 mol %. When the amount of the polar group-containing repeating units lower than 0.001 mol %, the ferromagnetic particles sometimes become insufficiently dispersed. When the amount of the polar group-containing repeating group is higher than 5.0 mol %, the polyurethane resins take on a moisture-absorbing property which sometimes diminishes the weather resistance of the resin.

Such polyurethane resins can be prepared by reacting polyisocyanate compounds with a polyol component. Generally, a polyester polyol, obtained by the reaction of a polyol with a polybasic acid is used as the polyol component.

The polyurethane resins which can be used in the present invention can be prepared by conventional methods for preparing a polyurethane resin. That is, the polyurethane resins which can be employed in the present invention can be prepared by (1) introducing a polar group into a polyester polyol by using a polar group-containing polybasic acid or a polar group-containing polyol as a part of a polybasic acid or a part of polyol, and (2) reacting the above polar group-containing polyester polyol thus-obtained with a polyisocyanate compound.

Examples of the above-mentioned polar group-containing polybasic acids and polar group-containing polyols include 5-sulphoisophthalic acid, 2-sulphoisophthalic acid, 4-sulphophthalic acid, 3-sulphophthalic acid, dialkyl 5-sulphoisophthalate, dialkyl 2-sulphoisophthalate, alkyl 4-sulphophthalate, alkyl 3sulphophthalate, dimethylol propionic acid, and the sodium or potassium salts of any of the aforementioned examples.

The above-described reaction is known, and can be used in practicing the present invention.

As the polyols which have no polar group and the polybasic acids which have no polar group used in the polyester polyol used in the present invention, those which are known in the art can be employed.

The number average molecular weight of the polar group-containing polyester polyols is generally from 500 to 8,000.

As the polyisocyanate compounds to be reacted with the polyester polyol, those generally known can be used for this purpose.

The number average molecular weight of the polyurethane resins is preferably from 10,000 to 200,000, more preferably from 15,000 to 60,000.

In addition to the above method, the polyurethane resins which can be employed in the present invention can also be prepared by (1) preparing a polyurethane resin having a hydroxyl group, then (2) reacting the hydroxyl group with a compound which has both a polar group and a chlorine atom (e.g., monochloroacetic acid), and (3) introducing the polar group into the polyurethane resins by means of a dehydrochloric acid reaction.

When the above-described vinyl chloride copolymer resins and polyurethane resins are used in combination as a binder in the present invention, the weight ratio of the vinyl chloride copolymer resin to the polyurethane resin is generally from 35/65 to 80/20, preferably from 40/60 to 70/30. When the above-described vinyl chloride copolymer resins and polyurethane resins are used in combination, the dispersibility of the ferromagnetic particles in a magnetic layer tends to improve to a greater extent than the improvement achieved when other resins are used. The ferromagnetic particles disperse readily in the binder when the above-described resins are used. Thus, although the dispersibility of ferromagnetic particles is improved in the present invention by using the above-described predetermined organic phosphorus compound, the electromagnetic conversion characteristics of the magnetic recording medium can be further improved by using a vinyl chloride copolymer and a polymethane resin in combination, in addition to using the predetermined organic compound.

The binder which can be used in the present invention is preferably a hardened binder containing polyisocyanate compounds in addition to the above-described vinyl chloride copolymer and the above-described polyurethane resins.

The polyisocyanate compounds may be those generally used in the art, and specific examples thereof include but are not limited to (i) a reaction product of 3 mols of diosocyanate (such as diphenylmethane-4,4'-diisocyanate, tolylene diisocyanate or xylylene diisocyanate) with 1 mol of trimethylol propane; (ii) a buiret adduct product of 3 mols of hexamethylene diisocyanate; (iii) an isocyanurate adduct product of 5 mols of tolylene diisocyante; (iv) an isocyanurate adduct product of 3 mols of tolylene diisocyanate with 2 mols of hexamethylene diisocyanate, and (v) a polymer of diphenylmethane diisocyanate.

The amount of polyisocyanate compound which can be used is generally the same or less than the amount of the above-described polyurethane resins.

As described above, by using polyurethane resins, vinyl chloride copolymers and polyisocyanate compounds, the polyisocyanate compounds form a three-dimetnsional cross-linking between the polyurethane resins and the vinyl chloride resins and thus form a strong binder.

In the present invention, it is preferred that a fatty acid be included in the magnetic layer. A fatty acid has a dual functions in that it functions as a lubricating agent in the magnetic layer, and also functions to improve the dispersibility of the ferromagnetic particles during the preparation of the magnetic coating composition.

When a fatty acid is included, the amount of fatty acid is generally from 0.1 to 5 parts by weight, preferably from 0.3 to 4 parts by weight per 100 parts by weight of the ferromagnetic particles.

Examples of a fatty acid which can be used in this invention include capric acid, undecyl acid, lauric acid, myristic acid, palmitic acid, stearic acid, beheic acid, montanic acid, oleic acid, elaidic acid, linolic acid, linolenic acid and stearolic acid.

The lubricating effect is enhanced when a fatty acid and a fatty acid ester are used in combination.

When a fatty acid ester is used, the amount thereof is generally from 0.1 to 5 parts by weight, preferably from 0.3 to 4 parts by weight per 100 parts by weight of the ferromagnetic particles.

When a fatty acid and a fatty acid ester are used in combination, the weight ratio of the fatty acid with respect to the fatty acid ester is generally from 1/9 to 9/1.

Examples of fatty acid esters which can be used in this invention include butyl myristate, methyl myristate, butyl stearate, ethyl palmitate, butoxy palmitate and butoxyethyl stearate.

It is preferred that inorganic particles having a Mohs' hardness of 5 or more be present in the magnetic layer of the magnetic recording medium of the present invention. Examples of inorganic particles are not particularly limited provided that the inorganic particles have a Mohs' hardness of 5 or more, such as $Al_2O_3$ (Mohs' hardness of 9), TiO (Mohs' hardness of 6), $TiO_2$ (Mohs' hardness of 6.5), $SiO_2$ (Mohs' hardness of 7), $SnO_2$ (Mohs' hardness of 6.5), $Cr_2O_3$ (Mohs' hardness of 9), $\alpha$-Fe203 (Mohs' hardness of 5.5), SiC (Mohs' hardness of 9) and TiC (Mohs' hardness of 9). These can be used alone or in combination. Among these, inorganic particles having a Mohs' hardness of 8 or more are preferred because these particles improve running durability.

Amount of inorganic particles which can be used is generally from 0.1 to 20 parts by weight, preferably from 1 to 10 parts by weight per 100 parts by weight of the ferromagnetic particles.

It is preferred that carbon black having an average particle diameter of from 10 to 300 nm is present as an antistatic agent in the medium of the present invention.

A method for preparing a magnetic recording medium of the present invention will be illustrated hereinafter.

The magnetic recording medium of this invention can be prepared by a conventional method which comprises the steps of; (a) dispersing ferromagnetic particles, binders, and if desired, the above-described additives in an organic solvent such as methyl ethyl ketone, toluene, butyl acetate or cyclohexanone to prepare a magnetic coating composition; (b) coating the resulting magnetic coating composition on a non-magnetic support to form a magnetic layer which generally has a dry thickness of from 0.2 to 10 $\mu$m; (c) subjecting the undried magnetic layer to magnetic orientation; (d) drying; (e) subjecting the dried layer first a surface smoothing treatment and then to a hardening treatment; and (g) then cutting the magnetic layer.

In the above method, it is necessary that the above-described organic phosphorus compound be included in the magnetic layer either by (A) using the pretreated ferromagnetic particles which were pretreated to contain the organic phosphorus compound as described above, or (B) by adding the organic phosphorus compounds into the magnetic coating composition at the time when the composition is mixed, kneaded and dispersed.

The magnetic layer of the present invention is generally provided directly on a non-magnetic support, but an adhesive layer or an undercoating layer can be provided between the support and the magnetic layer.

The present invention will be illustrated in more detail by the following Examples and Comparative Examples. However, the present invention is not to be construed as being limited to the Examples presented. In the Examples and Comparative Examples, all parts are by weight unless otherwise specified.

EXAMPLE 1

| Magnetic coating composition | |
| --- | --- |
| Ferromagnetic metal fine particles (Composition: Fe 94 wt %-Zn 4 wt %-Ni 2 wt %, Hc: 1500 Oe, $\sigma$s: 122 emu/g specific surface area: 54 m$^2$/g) | 100 parts |
| Vinyl chloride copolymer 1 | 12 parts |
| Polyurethane resin 2 | 8 parts |
| $\alpha$-Al$_2$O$_3$ | 5 parts |
| Stearic acid | 2 parts |
| Butyl stearate | 2 parts |
| Methyl ethyl ketone | 125 parts |
| Toluene | 125 parts |
| Phenyl phosphonic acid | 0.05 part |

Phenyl phosphonic acid was added to the toluene to prepare a 20 wt % toluene solution of phenyl phosphonic acid. This toluene solution and the balance of the above-listed composition were mixed, kneaded and dispersed in a ball mill for 48 hours; 8 parts of polyisocyanate compound ("Desmodule L", manufactured by Bayer Co., Ltd.) was added thereto; and the composition was then further mixed, kneaded and dispersed for 1 hour and filtrated using a filter having an average pore diameter of 1 $\mu$m to prepare a magnetic coating composition. The thus obtained magnetic coating composition was then coated on a 10 μm thick polyethylene terephthalate non-magnetic support to form a magnetic layer having a dry thickness of 4.0 μm.

After the non-magnetic support was coated with the magnetic coating composition but before the coating composition was dry, the entire medium was subjected to magnetic orientation using 3,000 gauss magnets. Then the medium was dried, subjected to a supercalendering treatment, and slit to an 8 mm width to prepare an 8 mm video tape.

The above-described Vinyl chloride copolymer 1 and Polyurethane resin 2 were prepared in the following manner.

Vinyl chloride copolymer 1

300 ml of nitrogen substituted distilled water having 0.6 g of polyvinyl alcohol dissolved therein, 0.15 g of azobisisobutyl nitrile, 16.6 g of glycidyl methacrylate, and 8.0 g of sodium 2-acrylamide-2-methylpropane sulfonate were added in a 500 ml stainless autoclave which was equipped with an electromagnetic induction stirrer and a pressure gauge. The autoclave was covered and cooled in a dry ice methanol bath so that the temperature of the inside of the autoclave fell to $-20°$ C.

Then, nitrogen gas was introduced to replace the gas in the autoclave, and 100 g of cooled liquid vinyl chloride was promptly added into the autoclave and stirred for about 15 minutes until the temperature reached 60° C so that a polymerization reaction could be conducted.

The polymerization reaction was conducted until the reactive components were consumed and the pressure decreased in the autoclave.

After the pressure decreased, the autoclave was cooled to a normal temperature, and vinyl chloride residing inside the autoclave was removed by introducing nitrogen. Then, the product was removed, sufficiently washed with water, and then the resulting white powdered polymer was filtrated and vaccum dried at 40° C for 12 hours.

As a result of element analysis, it was found that the product was a vinyl chloride copolymer comprised of vinyl chloride, sodium 2-acrylamide-2-methyl propane sulfonate and glycidyl methacrylate in a mole ratio of 87.5/2.5/10.

The intrinsic viscosity $[\eta]$ of the copolymer measured with methyl ethyl ketone was 0.21.

Polyurethane resin 2

582 g of dimethyl terephthalate, 157 g of dimethyl 5-sodium sulfoisophthalate, 434 g of ethylene glycol, 728 g of neopentyl glycol, 0.66 g of zinc acetate and 0.08 g of sodium acetate were added in a reaction vessel equipped with a thermometer, a stirrer and a partial reflux condenser. These components were reacted at from 140° to 220° C. for 2 hours, and then 1,212 g of sebacic acid was added thereto and reacted for 2 hours. Next, the pressure of the reactive system was reduced to 20 mmHg over a course of 30 minutes, and then the pressure was further reduced to from 5 to 20 mmHg. Then the reaction system was reacted at 250° C. for 50 minutes to prepare a polyester polyol by polymerization.

The thus-obtained polyester polyol was comprised of terephthalic acid, dimethyl 5 sodium sulfoisophthalate, sebacic acid, ethylene glycol and neopentyl glycol in a mole ratio of 15.3/2.9/30.7/22.5/28.6.

1,000 g of the above polyester polyol, 1,280 g of toluene, 850 g of methyl isobutyl ketone, 71 g of diphenyl methane diisocyanate and 1.2 g of dibutyl tin dilaurate were added into a reaction vessel equipped with a thermometer, a stirrer and a reflux condenser, and then were reacted for 8 hours at a temperature of from 70° to 90° C. The thus-obtained polyurethane resin contained dimethyl 5-sodium sulfoisophthalate in an amount of 0.25 mol %.

EXAMPLE 2

An 8 mm video tape was prepared by following the same procedure as in Example 1, except that the amount of phenyl phosphonic acid was 1.0 part.

EXAMPLE 3

An 8 mm video tape was prepared by following the same procedure as in Example 1, except that the amount of phenyl phosphonic acid was 5.0 parts.

EXAMPLE 4

An 8 mm video tape was prepared by following the same procedure as in Example 1, except that the amount of phenyl phosphonic acid was 8.0 parts.

EXAMPLE 5

1 part by weight of phenyl phosphonic acid was added and dissolved in 99 parts by weight of methyl ethyl ketone.

25 parts by weight of the above resulting solution was mixed with 100 parts by weight of the ferromagnetic metal fine particles used in Example 1, and then the thus-obtained mixture was heated to remove methyl ethyl ketone to obtain ferromagnetic metal fine particles pretreated with phenyl phosphonic acid. As a result of analysis, it was found that these ferromagnetic metal particles contained phenyl phosphonic acid in an amount of 0.9 wt %.

The 8 mm video tape of Example 5 was prepared in the same manner as in Example 1, except that the above ferromagnetic metal particles pretreated with phenyl phosphonic acid were used, and thus phenyl phosphonic acid was not added at the time of mixing, kneading and dispersing the magnetic coating composition.

EXAMPLE 6

An 8 mm video tape was prepared in the same manner as in Example 2, except that the same amount of diphenyl phosphonic acid was used instead of phenyl phosphonic acid.

EXAMPLE 7

An 8 mm video tape was prepared in the same manner as in Example 2, except that the same amount of phenyl phosphoric acid was used instead of phenyl phosphonic acid.

EXAMPLE 8

An 8 mm video tape was prepared in the same manner as in Example 2, except that the same amount of n-butyl phosphate was used instead of phenyl phosphonic acid.

COMPARATIVE EXAMPLE 1

An 8 mm video tape was prepared in the same manner as in Example 1, except that phenyl phosphonic acid was not used.

The above-obtained 8 mm video tapes were tested and evaluated in the manner described below.

Surface Gloss

The gloss on the surface of the magnetic layer was measured at an angle of incidence of 45° and at a reflective angle of 45° using a standard gloss meter manufactured by Suga Testing Machine Co., Ltd. The values shown in Table 1 are relative to the value of the surface gloss of the magnetic layer in Comparative Example, and the value of Comparative Example 1 is set at 100% for the purposes of this evaluation.

Maximum Residual Flux Density (Bm) and Squareness Ratio (SQ)

The squareness ratio (SQ) and the maximum residual flux density (Bm), indications of magnetic characteristics, were measured at a magnetic field strength (Hm) of 5 kOe using a vibration sample magnetometer (VSM) manufactured by Toei Kogyo Co., Ltd.

C/N Ratio

Using a commercially available 8 mm video tape recorder (Fujix-8 made by Fuji Photo Film Co., Ltd.), signals at 5 MHz were recorded. When those signals were reproduced, noises occurring within a range of 5±1 MHz were measured, and the ratio of reproduced signals to the noises was calculated. The output level measuring device "NV-870 HD" (produced by Matsushita Electric Industrial Co., Ltd.) was used. The values shown in Table 1 are relative to the value of the C/N ratio of the magnetic recording medium of Comparative Example 1, and the C/N value of Comparative Example 1 is set at 0 for the purposes of the evaluation.

Friction Coefficient

The friction coefficient of a video tape of each Example was measured while the tape was running in contact with a stainless pole (SUS 420 J, surface roughness 0.1 s, diameter 5 mm), at a speed of 1.4 m/sec. with a load of 20 g at a temperature of 25° C. and a humidity of 65% RH.

The results of the evaluation are shown in Table 1.

TABLE 1

|  | Surface gloss (%) | Bm (gauss) | SQ | C/N (dB) | Friction coefficient |
|---|---|---|---|---|---|
| Example 1 | 110 | 2950 | 0.85 | 1.8 | 0.35 |
| Example 2 | 120 | 3100 | 0.87 | 3.0 | 0.30 |
| Example 3 | 122 | 3020 | 0.85 | 2.8 | 0.29 |
| Example 4 | 105 | 2980 | 0.84 | 0.5 | 0.25 |
| Example 5 | 119 | 3080 | 0.86 | 1.9 | 0.34 |
| Example 6 | 112 | 2970 | 0.84 | 1.0 | 0.29 |
| Example 7 | 118 | 3030 | 0.86 | 2.6 | 0.30 |
| Example 8 | 115 | 3000 | 0.84 | 1.8 | 0.34 |
| Comparative Example 1 | 100 | 2800 | 0.81 | 0 | 0.35 |

When the friction coefficient was measured, the occurrence of stick-slip was observed. In Examples 1 to 8, stick-slip was not observed, but in Comparative Example 1, there was a slight induction of stick-slip.

It is clear from the results in Table 1 that the magnetic recording medium of the present invention has excellent characteristics as measured by each of the following categories: surface smoothness of the video tape (due to high surface gloss), magnetic characteristics (due to high Bm and SQ), electromagnetic conversion characteristics (due to high S/N), and both running properties and running durability due to low friction coefficient and absence of stick-slip.

On the other hand, in the Comparative Example, wherein no organic phosphorus compounds of the present invention were used, the results of all evaluations were substantially inferior to those of the Examples of the present invention. As explained herein, the Comparative Example yielded inferior results because the absence of the organic phosphorus compounds resulted in poor dispersibility of the ferromagnetic particles.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a magnetic layer comprising a binder and fine ferromagnetic metal particles having a specific surface area of 42 m$^2$/g or more dispersed therein and wherein said binder comprises a mixture of a polyurethane resin and a vinyl chloride resin, at least one of said polyurethane resin and said vinyl chloride resin containing a repeating unit containing a polar group, and said binder further comprising a polyisocyanate compound said magnetic layer containing from 1.0 to 5.0 parts by weight per 100 parts by weight of said ferromagnetic metal particles of an organic phosphorous compound represented by formula (B):

where R represents a phenyl group and M represents a hydrogen atom.

2. A magnetic recording medium as claimed in claim 1, wherein said binder is present in an amount of from 10 to 40 parts by weight per 100 parts by weight of said ferromagnetic particles.

* * * * *